[54] CARDENOLIDE-3-[2'-DESOXY-GLYCOSIDES] AND PROCESS FOR THEIR MANUFACTURE

[75] Inventors: Ulrich Stache, Hofheim; Werner Fritsch, Neuenhain; Werner Haede, Hofheim; Kurt Radscheit, Kelkheim; Ernst Lindner, Frankfurt am Main, all of Germany

[73] Assignee: Hoechst Aktiengesellschaft, Frankfurt am Main, Germany

[22] Filed: July 26, 1973

[21] Appl. No.: 382,639

[30] Foreign Application Priority Data
July 29, 1972   Germany............................ 2237377

[52] U.S. Cl.............................. 260/210.5; 424/180
[51] Int. Cl.².......................................... C07C 173/00
[58] Field of Search.................................. 260/210.5

[56] References Cited
UNITED STATES PATENTS
3,207,749   9/1965   Repenning........................ 260/210.5
3,398,139   10/1968  Lefebure.......................... 260/210.5
3,642,770   2/1972   Haede et al....................... 260/210.5

Primary Examiner—Johnnie R. Brown
Assistant Examiner—Cary B. Owens
Attorney, Agent, or Firm—Curtis, Morris & Safford

[57]   ABSTRACT

Cardenolide-3-[2'-desoxy-glycosides] of the formula

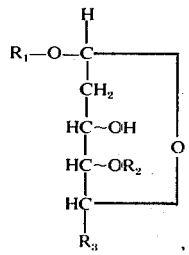

useful in the treatment of cardiac and circulatory diseases, wherein $R_1$ is a steroid of the 3-hydroxy-cardenolide series, $R_2$ is hydrogen, lower aliphatic acyl, or aromatic acyl, and $R_3$ is hydrogen, methyl, or $-CH_2OR_2$.

7 Claims, No Drawings

CARDENOLIDE-3-[2'-DESOXY-GLYCOSIDES] AND PROCESS FOR THEIR MANUFACTURE

This invention relates to cardenolide-3-[2'-desoxyglycosides], to a process for their manufacture and to their use in treating cardiac insufficiency, and circulatory diseases.

The present invention provides cardenolide-3-[2'-desoxy-glycosides] of the general formula

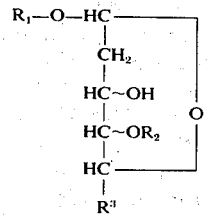

in which $R_1$ stands for a steroid radical of the 3-hydroxycardenolide series, $R_2$ stands for hydrogen or a lower aliphatic or aromatic acyl radical and $R_3$ stands for hydrogen, the methyl radical, or the $CH_2$—$OR_2$-group.

The present invention also provides a process for the manufacture of cardenolide-3-[2'-desoxy-glycosides] which comprises reacting cardenolide-3-[2', 3'-didesoxy-$\Delta^{2'(3')}$ glycosides] of the general formula

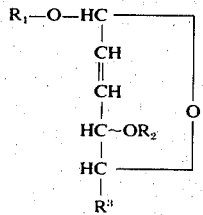

in which $R_1$, $R_2$ and $R_3$ are defined as above, with N-bromoacid amides, catalytically hydrogenating the cardenolide-3-[2'-bromo-2'-desoxy-glycosides] of the general formula

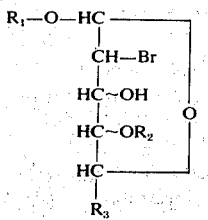

so obtained, in which $R_1$, $R_2$ and $R_3$ are defined as above, and if $R_2$ represents an acyl group, optionally hydrolyzing it.

The process of the invention takes place, for example, according to the following reaction scheme:

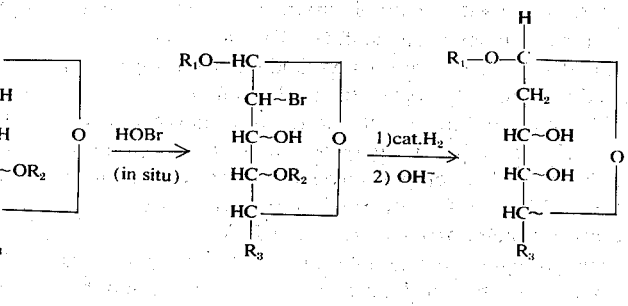

in which $R_1$, $R_2$ and $R_3$ are defined as above. The reaction products are, anomerically, in $\alpha$-configuration on the $C_1'$ atom.

Suitable starting materials are cardenolide-3-$\alpha$-[2',3'-didesoxy-$\Delta^{2'(3')}$-glycosides] which are, preferably, acylated in 4-position. They can be prepared by reacting the corresponding 3-hydroxy steroids with acylated 1,2-glycals according to Belgian Patent No. 731, 175. Those starting substances are for example:

digitoxigenin-, periplogenin-, 19-carboxymethylene-periplogenin-5β-lactone, 19-cyanomethylene-periplogenin-,uzarigenin-, canarigenin, K-strophanthidin, K-strophanthidol, or oleandrigenin-3-$\alpha$- [2',3'-didesoxy-$\Delta^{2'(3')}$-glycosides]. the glycosidal portion being based on glucose, rhamnose or mannose. Rhamnose is preferred not only in L- but also in D-configuration. Preferred acyl radicals ($R_2$) in the glycosidal portion are, for example, benzoyl aliphatic acyl radicals having 1 to 4 carbon atoms, for example formyl, acetyl, propionyl.

The process of the invention is carried out in the first reaction step by brominating the starting material using an N-bromic acid amide. It is reacted, for example, using N-bromo-acetamide in dioxane in the presence of perchloric acid or using N-bromo-sulfonamides, preferably, aromatic sulfonic acids, for example, N,N-dibromo-sulfonamide in slightly acid solution, for example, in the presence of acetic acid, in inert solvents, for example ethers dioxane, tetrahydrofurane or diglyme. Other N-bromic acid amides may also be used in the presence or in the absence of perchloric acid and the said solvents, for example, N-bromosuccinimide and other N-bromo-carboxylic acid amides.

The crude bromohydrins so obtained are subjected without further purification to a Raney-nickle treatment. Alkali in large excess must be removed from the Raney-nickle used for the reduction by digesting shortly for several times with water. By digesting two to three times shortly in a lower alcohol, for example, methanol, ethanol or another solvent miscible with water and inert against Raney-nickle the major part of water is removed. To render the catalyst especially active it is recommendable to lead a hydrogen stream through the stirred mixture for some time. The hydrogen atmosphere over the Raney-nickle suspension can then be replaced by a nitrogen atmosphere. Part of the organic suspending agent heretofore used can be replaced by a lower chlorinated hydrocarbon, for example chloroform or methylene chloride. The crude bromohydrin is advantageously taken up at room temperature or below in a suitable organic solvent miscible with the solvent over the Raney-nickle, for example, chloroform or methylene chloride, freed from acid possibly present by optionally washing with water, then drying is carried out with a suitable drying agent, for example, sodium or magnesium sulfate. The solution so pretreated is added to the Rany-nickle suspension which is, advantageously, to be stirred thoroughly.

The reaction time, i.e. the action of Raney-Nickel on the 2',3'-bromohydrin, may be 1 to 10 hours, preferably 3 hours. The temperature may be within the range of 0° to 30°C, preferably, room temperature, i.e. a temperature ranging from 18 to about 23°C.

The catalytic hydrogenation of the 2'-bromine atom is also advantageously carried out by using suitable noble metals, for example, palladium-activated Raney-nickle. This catalyst is advantageously freed from excess alkali by treating previously with dilute weak acids, for example acetic acid.

By repeatedly adding a suitable buffer solution, for example sodium acetate/ glacial acetic acid in methanol, the pH of the reaction mixture is maintained during hydrogenation at 4.5 to 7.0, preferably 5.5 to 6.5. Hydrogenation stops after absorption of a molar equivalent of hydrogen. The solvents used are those usual for hydrogenation, for example lower alcohols, tetrahydrofurane or dioxane and mixtures thereof.

The course of reaction of the process according to the invention could not be expected. It is, therefore, surprising, that the formal addition of hypobromic acid to the $\Delta^{2'(3')}$-double bond takes place in a stereospecifically and configuratively uniform reaction. OH is added to the 3'-carbon atom and Br is added to the 2'-carbon atom. This stereospecific addition reaction permits the preparation of novel glycoside. When using L-rhamnose in the glycosidal portion, the L-digitoxosides so, far, unknown are obtained. Furthermore, the course of the following hydrogenation of the bromine atom in the 2-position is surprising. As it is already known that the 20(22)-double bond in the lactone ring is hydrogenated with Raneynickle/$H_2$ [cf. Helv. chim. Acta 24, 716 (1941)] or with palladium/$H_2$ [cf. J. biol. Chemistry 54, 253 (1922)] under normal pressure and at room temperature, it could not be expected that the hydrogenolytic splitting of bromine with catalytically activated hydrogen from the 2'-position would be possible without attacking this double bond, as is the case in the process of the invention.

If the cardenolide-2'-desoxy-glycosides so obtained possess ester groups in their glycosidal portion, these groups can be hydrolyzed by usual hydrolytic processes, for example, by hydrolysis with ammonia in methanol or with potassium bicarbonate in alcohol/water to yield the free alcohol group. If the cardenolide-2',3'-didesoxyglycosides contain alcohol groups, these groups can be acylated, for example by reacting them with carboxylic acid anhydrides or carboxylic acid halides according to Schotten-Baumann.

The compounds of the invention have valuable pharmacological properties. They have, for example, cardiotonic activity (positive inotropic activity) and diuretic, anti-diarrheal, and, partially, surprisingly good properties of increasing the venous tonus. For example, digitoxigenin-3-L-digitoxoside, heretofore unknown, shows an even higher positive inotropic activity than digitoxigenin-3-L- [2',3'-didesoxy-$\Delta^{2'(3')}$]-rhamnoside on which it is based and which itself is already fairly more active than the digitoxin therapeutically employed. It is also surprising that this compound of the invention also shows a considerably higher activity of increasing the venous tonus than does digitoxin.

The new compounds have a high oral resorption rate, a weak cumulation, and slight toxic side effects, and are thus suitable for the treatment of cardiac insufficiency. For the treatment of disordered action of the heart or circulation, or edemas, diarrhea, or slackened veins, generally 3 to 5 doses per day of about 50 to 1000 micrograms of the new compounds are used.

The new compounds are administered orally in the form of tablets, dragees, or capsules which contain the active ingredient, preferably in an amount of from 0.5 to 5 % by weight, in admixture or conjunction with a pharmaceutically acceptable carrier, for example, starch, finely dispersed silicic acid, talcum or calcium carbonate. The new compounds may also be injected. For intramuscular injection, aqueous suspensions are used which may contain a surface active agent, for example, polyoxyethylene fatty acid ester and finely dispersed silicic acid, or oily suspensions in a natural oil, for example, sesame oil or castor oil, or in a synthetic triglyceride.

For intravenous injection, aqueous isotonic salt solutions, optionally with the addition of buffer substances and/or a solvent, are used.

The following Examples illustrate the invention.

EXAMPLE 1 a. Digitoxigenin-3-α- [2'-bromo-L-digitoxoside-4'-acetate]

3.17 g of digitoxigenin-3-α- [2',3'-didesoxy-$\Delta^{2'(3')}$-L-rhamnoside-4'-acetate] were dissolved in 95 ml of dioxane and a mixture of 2.28 ml of glacial acetic acid and 19 ml of water was added 2.2 g of N,N-dibromobenzosulfonamide were added and the resulting solution was allowed to stand for 3 hours at 20°C in the dark. The reaction mixture was poured onto 900 ml of water, which contained 520 mg of sodium bisulfate. Extraction with chloroform followed. The mixture was washed with water, dried with sodium sulfate and the solvents were separated by distillation. The remaining foam (4.9g)was instantly used without further treatment for the following hydrogenation reactions.

Beilstein test far halogen: highly positive

Typical infrared bands (KBr) at: 3490, 1775, 1735, 1620, 1230, 1120, 1060, 1020 $cm^{-1}$.

b. Digitoxigenin-3-α- [L-digitoxoside-4'-acetate] 245 g of moist Raney-nickel were washed with three 500 ml portions of water, then with, successively, a 300 ml, a 400 ml, and a 500 ml portion of methanol. The Raney-nickel was introduced with 500 ml of methanol into a reaction flask, through which nitrogen was passed for 15 minutes and hydrogen for 1½ hours. The methanol was replaced by a corresponding amount of methylene chloride and to that mixture a solution of 4.9 g of crude digitoxigenin -3-α- [2'-bromo-L-digitoxoside4'-acetate] in 500 ml of methylene chloride was added while stirring. The mixture was stirred for 3½ hours at 20°–25°C, a slow $N_2$-stream being led over the reaction mixture. The Raney-nickle was separated by filtration through a clarification sheet filter. It was washed with methylene chloride and the filtrate was condensed. The residue obtained was filtered with methylene chloride over a little $Al_2O_3$, Woelm, neutral, activity stage II. After separating the solvent by distillation the residue obtained was crystallized out from diisopropyl ether. 2.3 g of digitoxigenin -3-α- [L-digitoxoside-4'-acetate] melting point, 215°–218°C, (determined by means of a Kofler heating block) were obtained.

Typical infrared bands (KBr) at; 3500, 1780, 1750, 1735, 1620, 1235, 1100, 1045, 1025, 990 cm$^{-1}$.

2. A solution of 2.4 g of crude digitoxogenin-3-α[-2'-bromo-L-digitoxoside-4'-acetate] in 20 ml of methylene chloride and 40 ml of methanol was added to a prehydrogenated suspension of a mixed catalyst of 8.4 g of Raney-nickle and 840 mg of palladium-(II)-chloride in 80 ml of methanol and 2 ml of water and catalytically hydrogenated. The pH was maintained at 6.0 to 6.6 by steadily adding dropwise a solution of 9.24 g of sodium acetate, containing water of crystallization, in 8 ml of glacial acetic acid and 46 ml of methanol. After about 5 hours one mole equivalent of hydrogen was absorbed and the hydrogenation came to a stop. The catalyst was separated by filtration. The filtrate was condensed in vacuo. The residue was digested with water and dried. After filtration with methylene chloride over a little $Al_2O_3$, Woelm, neutral, activity stage II, crystallization took place on trituration with ether after separating the solvent by distillation. The same reaction product was obtained having the same melting point and infrared spectrum as described under b1.).

The catalyst used in the hydrogenation was prepared as follows:

8.4 g Raney-nickel were stirred with 40 ml of water for 5 minutes. The water was decanted and the residue suspended in 100 ml of water. To the stirred suspension a solution of 840 mg of palladium dichloride in 200 ml of water and 2.0 ml of concentrated hydrochloric acid were successively added, the pH not being allowed to fall below 3.1. The catalyst was suction-filtered, thoroughly washed with water, and aftertreated by stirring three times with methanol and following subsequent decanting.

c. Digitoxigenin-3-α- [L-digitoxoside]

To hydrolyze the 4'-acetyl group, 2.2 g of the reaction product crystallized according to b) were dissolved in 80 ml of methanol and a solution of 751 mg of potassium bicarbonate in 7.5 ml of water was added at the boiling point. The reaction mixture was boiled under reflux for 25 minutes, cooled to 20°C and poured on 500 ml of semi-saturated aqueous sodium chloride solution. This was extracted with methylene chloride. The extract was washed with water, dried and the solvent was separated by distillation. The foam obtained was crystallized from diisopropyl ether. 1.5 g of digitoxigenin-3α- [L-digitoxoside]. melting point 179°–185°C, recrystallized from methylene chloride: ether, were obtained.

Melting point: 196°–198°C (determined by means of a Kofler heating block).

Typical infrared bands (KBr) at; 3480, 1775, 1740-1750, 1730, 1620, 1100, 1050, 1025, 990 cm$^{-1}$.

$[\alpha] D^{20°} = -51.6°$ (c = 0.5; methanol).
UV: λ max = 217 mµ (methanol);
ε = 16 400.

The starting compound was prepared as follows:

Digitoxigen-3-α-[2',3'-didesoxy-$\Delta^{2'(3')}$-L-rhamnoside4'-acetate

To a solution of 1.1 g of digitoxigenin in 9.6 ml of absolute tetrahydrofurane, 1.8 ml of diacetyl-L-rhamnal and 0.07 ml of phosphoroxy chloride were added. After stirring for 5 hours at 20°–25°C (heating of the reaction mixture over 40°C is to avoid because of the formation of undesirable secondary products hard to separate and of the reduction of the yield involved), the reaction mixture was poured on 50 ml of water, which contained excess $NaHCO_3$. This was exhaustedly extracted with cloroform, the extracts were washed with water, dried and the solvents were separated by distillation in vacuo. About 2.5 g of oil remained, which were gradually crystallized on trituration with ether. The crystals were separated by filtration and washed with a little cold ether. 1.01 g of digitoxigenin-3-α- [2'-desoxy-2',3'-anhydro-L-rhamnoside-4'-acetate].

Melting point: 137–140°C, were obtained. (Kofler heating block).

Typical infrared bands at 3515, 1780, 1750, 1735, 1615, 1230, 1020, 740 cm$^{-1}$ (in KBr ).

UV-spectrum (methanol): λmax = 216–217 mµ; ε = 16 600.

EXAMPLE 2 a. 19-carboxymethylene-periplogenin-5β-lactone-3- [2'-bromoL-digitoxoside-4'-acetate]

1.17 g of 19-carboxymethylene-periplogenin-5β-lactone3-α- [2,',3'-didesoxy-$\alpha^{2'(3')}$-L-rhamnoside-4'-acetate] were dissolved in 30 ml of dioxane and a mixture of 0.75 ml of glacial acetic acid and 5.9 ml of water was added. 315 mg of N-N-dibromobenzenesulfonamide were added and the resulting solution was allowed to stand at 20°C for 3 hours in the dark. The reaction mixture was poured onto 300 ml of water, which contained 120 mg of sodium bisulfite. This was extracted with chloroform. The extract was washed with water, dried with sodium sulfate and the solvent was distilled. The remaining foam (1.5 g) was instantly used without further treatment for the following hydrogenation reaction.

Beilstein test for halogen: highly positive.

b. 19-carboxymethylene-periplogenin-5β-lactone-α- [L-digitoxoside-4'-acetate]

82 g of moist Raney-nickel were washed with three 170 ml portions of water, then, successively, with a 100 ml, a 130 ml, and a 170 ml portion of methanol. The Raney-nickel was put with 170 ml of methanol into a reaction flask, then nitrogen was led through for 15 minutes and hydrogen for 1½ hours. The methanol was replaced by a corresponding amount of methylene chloride and to that mixture a solution of 1.5 g of crude 19-carboxymethylene-periplogenin-5β-lactone-3- [2'-bromo-L-digitoxiside4'-acetate] in 170 ml of methylene chloride was added. Thus was stirred at 20°–25°C for 3½ hours, a slow $N_2$-stream being led over the reaction mixture. The Raney-nickel was separated by filtration over a clarification sheet filter and washed with methylene chloride. The filtrate was condensed. The residue obtained was filtered with methylene chloride over a little Al₂O₃, Woelm, neutral, activity stage II. After distillation of the solvent, the residue obtained was crystallized from diisopropyl ether. 1.1 g of 19-carboxymethylene-periplogenin-5β-lactone-3-[L-digitoxoside-4'-acetate], melting point: 180°–185°C (determined by means of the Kofler heating block) were obtained.

Typical infrared bands (KBr) at; 3400, 1775, 1750–1735 (broad), 1615, 1235, 1100, 1025, 985 cm⁻¹.

UV (methanol): λ max = 215 mμ(ε = 23 100).

c.
19-carboxymethylene-periplogenin-5β-lactone-3-α-[L-digitoxoside]

To hydrolyze the 4-acetyl group, 1.1 g of the reaction product obtained were dissolved in 40 ml of methanol and a solution of 375 mg of potassium bicarbonate in 3.75 ml of water was added at the boiling point. The reaction mixture was boiled under reflux for 25 minutes, cooled to 20°C and poured on 250 ml of a semi-saturated aqueous sodium chloride solution. This was extracted with methylene chloride. The extract was washed with water, dried and the solvent was separated by distillation. The foam obtained was crystallized from diisppropyl ether. 0.7 g of 19-carboxymethylene-periplogenin-5β-lactone-3- [L-digitoxoside] recrystallized from methylene chloride/ether was obtained.

Melting point: 184°–186°C (determined by means of a Kofler heating block).

Typical infrared bands (KBr) at: 3400, 1780, 1745, 1710, 1625, 1150, 1110, 1080, 1040, 1005, 990 cm⁻¹.

UV: λ max = 212–213 mμ (methanol);
ε = 22200.

EXAMPLE 3 a. K-strophanthidin -3- [2'-bromo-L-digitoxoside-4'-acetate]

1.1 g of K-strophanthidin -3-α- [2',3', -didesoxy-Δ²'⁽³'⁾-L-rhamnoside-4'-acetate] were reacted as described in Example 2a and worked up. The foam which remained (1.4 g) was instantly used without further treatment for the following hydrogenation reaction.

Beilstein test for halogen: positive b K-strophanthidin -3-[L-digitoxoside-4'-acetate]

1.4 g of the 2',3'-bromohydrin just obtained were treated in the manner described in Example 2b) with Raney Nickel and worked up. 1 g of K-strophanthidin -3-[L-digitoxoside-4'-acetate], melting point: 165°–169°C, was obtained.

Beilstein test for halogen: negative c. K-strophanthidin -3-α- [L-digitoxoside]

1 g of the K-strophanthidin -3- [L-digitoxoside-4'-acetate] obtained according to b) was hydrolyzed and worked up in the manner indicated in Example 2c). The crystals obtained after trituration with diisopropyl ether were recrystallized from methylene/ether and yielded K-strophanthidin-3-α-[L-digitoxoside], melting point: 162°–166°C.

Typical infrared bands (KBr) at: 3400 (Broad), 2740, 1775, 1730, 1715, 1615, 1070, 1025, 990 cm⁻¹.

UV (CH₃OH): λ max = 217 mμ, ε = 18100.

We claim:

1. A cardenolide-3-[2'-desoxy-glycoside] of the formula

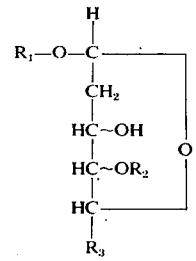

wherein R₁ is a steroid of the 3-hydroxy-cardenolide series, R₂ is hydrogen, benzoyl, or alkanoyl having 1 to 4 carbon atoms, and R₃ is hydrogen, methyl, or —CH₂OR₂.

2. A compound as in claim 1 which is digitoxigenin-3-α-[L-digitoxoside].

3. A compound as in claim 1 which is 19-carboxymethyleneperiplogenin-5β-lactone-3-α-[L-digitoxoside].

4. A compound as in claim 1 which is K-strophanthidin3-α-[L-digitoxoside].

5. A method for making a cardenolide-3-[2'-desoxyglycoside] of the formula

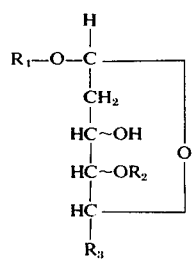

wherein R₁ is a steroid of the 3-hydroxy-cardenolide series, R₂ is hydrogen, benzoyl, or alkanoyl having 1 to 4 carbon atoms, and R₃ is hydrogen, methyl, or –CH₂OR₂, which method consists essentially of reacting a cardenolide-3-[2',3'-didesoxy-Δ²'⁽³'⁾-glycoside] of the formula

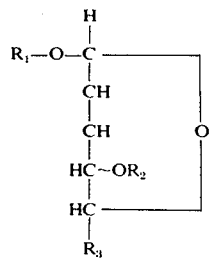

with an N-bromo acid amide to form a cardenolide-3-[2'-bromo-2'-desoxy-glycoside] of the formula

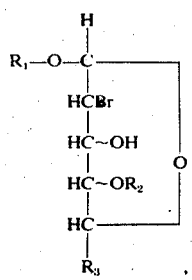

and then hydrogenating said cardenolide-3-[2'-bromo-2'-desoxyglycoside] in the presence of a Raney-nickel catalyst to form the desired compound.

6. A method as in claim 5 wherein said Raney-nickel catalyst is noble-metal activated.

7. A method as in claim 5 wherein $R_2$ is benzoyl or alkanoyl having 1 to 4 carbon atoms and wherein $R_2$ is removed from such a cardenolide-3-[2'-desoxyglycoside] by hydrolysis under alkaline conditions.

* * * * *